United States Patent [19]

Heilman et al.

[11] 4,167,539

[45] Sep. 11, 1979

[54] STYRENE-GRAFTED POLYANHYDRIDE COPOLYMER

[75] Inventors: William J. Heilman, Houston, Tex.; Frank C. Peterson, Joplin, Mo.; Mical C. Renz; Leslie P. Theard, both of Houston, Tex.

[73] Assignee: Gulf Oil Corporation, Pittsburgh, Pa.

[21] Appl. No.: 775,432

[22] Filed: Mar. 8, 1977

Related U.S. Application Data

[63] Continuation-in-part of Ser. No. 590,460, Jun. 26, 1975, Pat. No. 4,017,453, which is a continuation of Ser. No. 501,634, Aug. 29, 1974, abandoned.

[51] Int. Cl.$^2$ .............................................. C08L 63/00
[52] U.S. Cl. .............................. 525/117; 260/18 PF; 260/42.18; 525/285; 525/385; 525/359; 525/286
[58] Field of Search ............... 260/836, 837 R, 859 R, 260/878, 886, 18 PF

[56] References Cited

U.S. PATENT DOCUMENTS

| | | | |
|---|---|---|---|
| 2,047,398 | 7/1936 | Voss et al. | 260/886 X |
| 2,971,939 | 2/1961 | Baer | 260/886 X |
| 3,306,954 | 2/1967 | Moore | 260/886 |
| 3,374,209 | 3/1968 | Hay et al. | 260/886 X |
| 3,417,162 | 12/1968 | Zimmerman et al. | 260/837 R |
| 3,620,990 | 11/1971 | Hazen et al. | 260/886 X |
| 3,717,557 | 2/1973 | Peterson et al. | 260/886 X |
| 3,729,451 | 4/1973 | Blecke et al. | 260/886 X |
| 3,852,236 | 12/1974 | Heilman | 260/886 X |
| 3,997,499 | 12/1976 | Heilman et al. | 260/886 X |

Primary Examiner—Theodore E. Pertilla

[57] ABSTRACT

A polyanhydride copolymer is made having styrene grafted onto the linear backbone chain of a styrene-maleic anhydride copolymer or a 1-alkene-maleic anhydride copolymer. This graft copolymer is also prepared in the presence of an epoxy compound such as monoepoxide or an epoxy resin for subsequent curing.

12 Claims, No Drawings

4,167,539

STYRENE-GRAFTED POLYANHYDRIDE COPOLYMER

This application is a continuation-in-part of Ser. No. 590,460, filed June 26, 1975, now U.S. Pat. No. 4,017,453, which is a continuation of Ser. No. 501,634, filed Aug. 29, 1974, now abandoned.

FIELD OF THE INVENTION

This invention relates to styrene-maleic anhydride copolymers and 1-alkene-maleic anhydride copolymers having pendant styrene chains grafted to the linear styrene-maleic anhydride or 1-alkene-maleic anhydride backbone chain and to methods of making these graft copolymers. This invention further relates to the preparation of these styrene-grafted polyanhydrides in the presence of an epoxy compound for subsequent curing to a thermoset resin.

DESCRIPTION OF THE PRIOR ART

Linear styrene-maleic anhydride copolymers have been made having a styrene to maleic anhydride mol ratio from about 1:1 to about 10:1 or higher. In the equimolar copolymer the styrene as a styrene group and maleic anhydride as a succinic anhydride group alternate in linear chains. It is known that equal molar amounts of styrene monomer and maleic anhydride monomer readily react to the linear, alternating 1:1 copolymer, and that the two monomers still react to form the linear, alternating 1:1 copolymer if an excess of styrene is used. In contrast, it is also known that a linear styrene-maleic anhydride copolymer can be made in which the styrene to maleic anhydride ratio in the linear chain is substantially greater than 1:1. In this copolymer each succinic anhydride group alternates with a block of one or more styrene groups in the linear backbone chain of the copolymer. A typical method of preparing these block copolymers involves the incremental addition of maleic anhydride to refluxing styrene. Maleic anhydride and 1-alkenes, such as 1-hexene, copolymerize to form linear chains of the monomers alternating in a 1:1 molar ratio.

SUMMARY OF THE INVENTION

We have discovered that copolymers of styrene or a 1-alkene and maleic anhydride can be prepared with pendant styrene chains containing one or more styrene molecules randomly grafted to the linear styrene-maleic anhydride or 1-alkene-maleic anhydride backbone chain. In these styrene grafted copolymers the linear backbone chain can be the conventional chain of a styrene group or a 1-alkene group alternating with a succinic anhydride group or this linear backbone chain can be the styrene-rich styrene-maleic anhydride copolymers containing random blocks of two or more adjacent styrene molecules in series in the backbone chain. Additionally, the styrene can be grafted onto a linear backbone chain of a terpolymer consisting of styrene, 1-alkene and succinic anhydride groups in which a succinic anhydride group alternates with a styrene or 1-alkene group. The styrene-grafted styrene-maleic anhydride copolymers of our invention possess properties which distinguish them from the conventional linear styrene-maleic anhydride and 1-alkene-maleic anhydride copolymers including the blocked styrene copolymers.

One property of particular significance obtained in the styrene-grafted copolymers is an enhancement in solubility properties of the graft copolymer. For example, the solubility of the equimolar copolymer of styrene and maleic anhydride in a diglycidyl ether of bisphenol A having an epoxy equivalent value of about 180 is 3.9 grams per 100 grams of the epoxy resin at 80° C. However, when three and one-half mols of styrene are grafted onto the backbone chain of this linear styrene-maleic anhydride copolymer per anhydride equivalent of the copolymer, the 80° C. solubility is increased to 22.4 grams per 100 grams of epoxy resin. This is particularly surprising since polystyrene per se has a very low solubility in epoxy resins. Thus, a commercial polystyrene was found to have an 80° C. solubility in this same epoxy resin of only 2.2 grams per 100 grams of the resin.

In accordance with our invention the styrene-grafted polyanhydride copolymer can be made by grafting styrene directly onto a conventional preformed linear styrene-maleic anhydride copolymer or linear 1-alkene-maleic anhydride copolymer. This linear copolymer can suitably have a styrene to maleic anhydride mol ratio of 1:1 to about 10:1, preferably 1:1 to about 5:1, and most preferably 1:1 to about 3:1 or a 1-alkene to maleic anhydride mol ratio of about 1:1 and having an average of between 3 and about 500, preferably 4 and about 200, most preferably 4 and about 100, repeating units. In the block copolymers a repeating unit is defined as a succinic anhydride group. In this procedure the linear polyanhydride copolymer can be dissolved in a suitable solvent, together with a peroxide catalyst such as benzoyl peroxide. The solution is heated to an elevated temperature of about 50° C. to about 150° C. to activate the peroxide catalyst. The styrene is then incrementally added to the heated solution until a ratio of from about 0.5:1 to about 10:1, preferably about 1:1 to about 5:1 mols of styrene have been added per anhydride equivalent. Anhydride equivalent is defined as the weight in grams of copolymer per succinic anhydride group. In the 1:1 alternating copolymer the anhydride equivalent is the same as a repeating unit in the copolymer chain. After completion of the reaction, the grafted copolymer can be precipitated from the reaction solution by admixture with a second solvent in which the graft copolymer is insoluble, such as hexane. The graft copolymer can also be recovered by evaporating off the solvent or by any other conventional technique for removing volatile solvent from a resin. The solvent used as a reaction medium can suitably be a liquid aliphatic hydrocarbon having at least one oxygen atom only bonded to one or more carbon atoms. Suitable as a solvent is tetrahydrofuran; dioxane; a ketone, ether or carboxylic acid ester having up to about 10 carbon atoms and mixtures thereof, and the like, such as methyl ethyl ketone, dibutyl ether, ethyl acetate, and the like.

In another method for preparing the polyanhydride graft copolymer, maleic anhydride and preformed copolymer are mixed together in a stoichiometric excess of styrene, that is a mol ratio of styrene to maleic anhydride of about 1.5 to about 8:1, preferably about 2:1 to about 5:1, until they dissolve in the styrene. A separate solvent such as dioxane, and the like, can additionally be used if desired. The solution is heated in the presence of a free radical initiator at a temperature of 50°–150° C., sufficient to activate the free radical initiator, until the maleic anhydride and styrene are completely reacted. No polystyrene is obtained since excess styrene grafts onto polyanhydride copolymer. The techniques used in this preparation and the results obtained indicate that the presence of maleic anhydride monomer in some manner aids the grafting reaction.

The styrene-maleic anhydride graft copolymer can also be prepared in situ in solution with an epoxy containing composition by the free radical reaction of a stoichiometric excess of styrene, maleic anhydride and preferably including a preformed linear polyanhydride copolymer with the styrene serving as solvent. By this reaction the soft, sticky initial resin mixture is thickened to an intermediate composition which can range from a pliable to a rigid material. This thickening reaction is carried out under conditions that prevent a substantial anhydride-epoxy cross-linking reaction, which is evidenced by gelling. The intermediate product is a handleable, thermosettable, homogeneous resin mixture of grafted polyanhydride molecules and the epoxy composition. During a subsequent final cure, the anhydride and epoxy groups interreact to form a hard, rigid, thermoset product.

The initial resin mixture can suitably contain, as desired, an anhydride accelerator for the second stage cure, fiber reinforcement, filler, and the like. One particular advantage of preparing the thickened intermediate by this method, in contrast with the possible alternate method of dissolving preformed polyanhydride copolymer and the epoxy compound in a volatile, non-reacting solvent to obtain mixing and then driving off the solvent, is that this instant method involves no solvent removal stage, since solvent styrene completely reacts, and there is no residual solvent to cause bubbling during final cure of the thickened intermediate, which would result from incomplete solvent removal.

Since styrene is an excellent and inexpensive solvent, it is desirable to incorporate an excess of this reactive monomer into the resin mixture to obtain the desired resin fluidity and adjust the cross-link density in the cured resin. It would be expected from existing knowledge not only that the maleic anhydride would react with styrene in equal molar proportions but also that the excess styrene would form property-degrading polystyrene molecules interspersed therein. We have surprisingly discovered that excess styrene and maleic anhydride are reacted in our process to form a styrene-maleic anhydride copolymer having a styrene to maleic anhydride ratio substantially greater than one to one under conditions that the prior art indicates produce a one to one molar ratio. It has been further discovered that under the conditions at which the copolymerization is carried out, excess styrene attaches to styrene-maleic anhydride copolymer by graft polymerization in the form of relatively short graft branches. Due to this graft polymerization an initial resin solution containing a substantial molar excess of styrene can be successfully utilized without a significant formation of polystyrene which would degrade the resin product. And advantageously the resulting graft copolymer is more soluble in the epoxy composition.

In preparing a styrene-maleic anhydride copolymer in situ in admixture with an epoxy compound by the copolymerization of styrene and maleic anhydride, we have found that the presence of preformed copolymer, such as styrene-maleic anhydride copolymer is preferred in the starting resin solution, although its presence is not critical to successful reaction, due to its beneficial effect in the overall properties of the fully cured product. This preformed polyanhydride provides a nucleus for styrene and maleic anhydride addition, including styrene grafting, in a more controlled reaction. The presence of preformed polyanhydride also exercises a beneficial control of the free radical reaction and reduces the amount of the styrene-maleic anhydride copolymer to be produced by the highly exothermic reaction of styrene with maleic anhydride in order to obtain the requisite anhydride-epoxy cross-link density, thereby reducing the overall amount of heat generated by this reaction. This reduction in the generation of heat in the thickening reaction is enhanced by the fact that the graft reaction of styrene to the polyanhydride copolymer generates much less heat than the reaction of styrene with maleic anhydride.

Chemical free radical initiators are preferred for carrying out the graft reaction. In the procedure for grafting styrene onto the already formed polyanhydride, a peroxide initiator, such as benzoyl peroxide, methyl ethyl ketone peroxide, dicyclohexyl peroxydicarbonate, t-butyl peroxyneodecanoate, t-butyl peroxypivalate, and the like are used. In the procedure involving a combination grafting and copolymer formation, which includes maleic anhydride monomer in the reaction system, either a peroxide initiator including a promoter such as vanadium neodecanoate or cobalt naphthenate, as needed, or an azo free radical initiator can be used. Suitable azo compounds include 2,2'-azobis(2,4-dimethyl-4-methoxyvaleronitrile), 2,2'-azobis(2,4-dimethylvaleronitrile), 2,2'-azobis(isobutyronitrile), 2-t-butylazo-2-cyano-4-methoxy-4-methylpentane, and the like.

In the reaction involving styrene, maleic anhydride, and a preformed polyanhydide in the presence of an epoxy compound to form a thickened intermediate comprising styrene-grafted polyanhydride molecules and epoxide molecules for subsequent curing to a hard infusible resin, the thickening reaction is carried out under suitable conditions to insure that substantial cross-linking, as indicated by gelation, does not occur in the intermediate product. These conditions include the temperature, the time of reaction, the nature of the components including the free radical initiator, the anhydride accelerator, and the like. This thickening reaction is suitably carried out at a maximum internal temperature in the resin mixture of about 150° C., preferably about 125° C., and most preferably about 100° C. as determined by an embedded thermocouple. At the higher temperatures rapid heat up and cool down is preferred to minimize the cross-linking reaction.

It is of critical significance that the selection of the anhydride accelerator be carefully correlated with the free radical initiator to insure that the desired copolymerization reaction occurs without substantial cross-linking. For example, the anhydride accelerator must be substantially inactive during the copolymerization reaction at the temperature and for the time that the free radical reaction is carried out. Thus, the chemical free radical initiator should have a relatively short half-life at a moderate temperature and be used in suitable amount to cause an active copolymerization reaction at a moderate temperature. In contrast with the activity of the free radical initiator, the anhydride accelerator will possess a low activity for the anhydride-epoxy reaction. That is, low activity as applied to the anhydride accelerator is a relative term which is applied as a contrast with the substantially greater activity of the free radical initiation at the same conditions. Furthermore, the selection of the chemical free radical initiator must be correlated with the anhydride accelerator to avoid any interference of the effect of the free radical initiator by the anhydride accelerator. The peroxide initiators appear to be more susceptible to a deactivating effect by some anhydride accelerators.

The preformed polyanhydride which is particularly useful in preparing the epoxy-containing thickened intermediate composition herein is a conventional linear styrene-maleic anhydride copolymer having a styrene to maleic anhydride ratio of from 1:1 to about 10:1, preferably from 1:1 to about 5:1 and most preferably from 1:1 to about 3:1. The preformed polyanhydride can also be a 1-alkene-maleic anhydride copolymer having a 1-alkene to maleic anhydride mol ratio of about 1:1. The preformed polyanhydride can have an average of about two to about 500 repeating units, or succinic anhydride groups, preferably about three to about 200 repeating units per molecule. Suitable 1-alkenes from six to about 18 carbon atoms, preferably about six to about 12 carbon atoms, such as 1-hexene, 5-methyl-1-pentene, 1-octene, 1-decene, 1-dodecene, 1-octadecene and the like, can be used in making the preformed polyanhydride.

The mol ratio of styrene to maleic anhydride that is used in making the epoxy containing thickened intermediate is between about 1.5:1 and about 8:1, preferably about 2:1 to about 4.5:1. The styrene is desirably present in sufficient amount to dissolve the resin components and can broadly be from about five to about 80 weight percent, preferably about 10 to about 60 and most preferably about 15 to about 50 weight percent of the resin composition. The initial mixture can suitably contain an anhydride equivalent ratio of maleic anhydride to the total anhydride equivalents in the resin mixture of about 0.2:1 to about 1:1, preferably about 0.4:1 to about 0.9:1. The preformed polyanhydride can be replaced with up to about 50 percent of a saturated monoanhydride, based on anhydride equivalents such as phthalic anhydride, tetrahydrophthalic anhydride, hexahydrophthalic anhydride, methyltetrahydrophthalic anhydride, dodecenylsuccinic anhydride, chlorendic anhydride, a mixture of methyl bicyclo (2.2.1)-heptane-2,3-dicarboxylic anhydride isomers (Nadic methyl anhydride), mixtures thereof, and the like.

The epoxide composition that is useful in forming the handleable, thermosettable composition is a saturated monoepoxy compound, a polyepoxide or epoxy resin and mixtures of these. The saturated monoepoxide which is used herein is a liquid or solid at room temperature (20°–25° C.) having between three and about 20 carbon atoms, preferably between three and about 12 carbon atoms, per molecule. The lower molecular weight liquid monoepoxides that are useful herein will also contribute a solvent effect to the resin mixture in addition to that provided by the olefinically unsaturated monomer. When the intermediate composition that is made in accordance with the invention herein is to be stored for a significant period of time prior to the final curing, it is preferred that only an epoxide composition of relatively low volatility be used in the resin formulation.

The saturated monoepoxide can suitably be an aliphatic, cycloaliphatic, aromatic or mixed aliphatic-aromatic monoepoxide consisting of hydrogen atoms, carbon atoms and the one oxygen atom. The saturated monoepoxide can also be an aliphatic, cycloaliphatic, aromatic or mixed aliphatic-aromatic epoxy-containing ether or epoxy-containing ester consisting of hydrogen atoms, carbon atoms and the epoxy and ether or ester oxygen atoms. These saturated monoepoxides can further contain one or more halogen atoms, preferably chlorine atoms. Mixtures of two or more of these saturated monoepoxy compounds are also useful herein. The saturated monoepoxides are available both as 1,2-epoxy compounds in which the epoxy group is located in a terminal position in the molecule and as compounds in which the epoxy group is in an internal position in the molecule.

Saturated monoepoxides which are useful in preparing the moldable resin compositions include 1,2-epoxy hexane; 1,2-epoxy decane; 1,2-epoxy-7-propyl decane; 1,2-epoxy dodecane; 1,2-epoxy octadecane; 1,2-epoxy eicosane; 7,8-epoxy hexadecane; 3,4-epoxy hexane; 2,3-epoxy-2,3-dimethylbutane, and the like. Also useful in preparing these moldable resin compositions are 2,3-epoxy-2-phenylhexane; cyclohexane oxide, epoxycyclohexane; styrene oxide, epoxy isopropylbenzene, and the like. The group of epoxy-containing ethers which are useful includes 1,2-epoxy-2-phenoxypropane; 1,2-epoxy-2-butoxypropane; methyl glycidyl ether; butyl glycidyl ether; octyl glycidyl ether; 2-propyloctyl glycidyl ether; phenyl glycidyl ether; isopropyl glycidyl ether; octadecyl glycidyl ether; amyl glycidyl ether; tolyl glycidyl ether; naphthyl glycidyl ether; and the like.

The group of epoxy containing esters which are useful includes glycidyl benzoate; glycidyl p. methyl benzoate; glycidyl acetate; diacetate of monoglycidyl ether of glycerol; dipropionate of the monoglycidyl ether of glycerol; glycidyl propionate; glycidyl methyl maleate; glycidyl stearate; methyl 1,2-epoxypropionate; butyl 1,2-epoxypropionate; glycidyl caprolate, and the like. Useful halogen-substituted saturated monoepoxides of the above groups include epichlorohydrin; epibromohydrin; 2,3-epoxy-2,4-dimethyl-4-chlorobutane; 1,2-epoxy-3-chlorobutane; 1,2-epoxy-5-chlorodecane; chlorophenyl glycidyl ether; pentachlorophenyl glycidyl ether; hexachlorocyclohexyl glycidyl ether, and the like.

The epoxy resin can be a single compound containing at least two epoxy groups in which case it is a diepoxide. It can also contain a vareity of molecular species having a varying number of epoxy groups per molecule such that the average number of epoxy groups per molecule, that is the epoxy equivalent value, is specified. The epoxy equivalent value of these polyepoxides comprising a mixture of molecular species is greater than one and is preferably about two or more, but will generally not be a whole integer. The epoxy equivalent value is obtained by dividing the average molecular weight of the polyepoxide by its epoxide equivalent weight (grams of the polyepoxide containing one gram equivalent of epoxide). The polyepoxide can be aliphatic, cycloaliphatic, aromatic, heterocyclic mixtures of these, saturated or unsaturated, and the like. It can be liquid or solid but must be soluble in the resin solution, or if not soluble capable of forming a homogeneous dispersion in the resin solution.

This broad class of epoxy resins which is useful is exemplified by reference to several of the better known types. The glycidyl group of epoxy resins is an important and useful type of epoxy resin. This group includes the glycidyl ethers, the glycidyl esters, the glycidyl amines, and the like. The glycidyl ethers include the glycidyl ethers of mononuclear polyhydric phenols, polynuclear polyhydric phenols and the aliphatic polyols. They may be single compounds or more commonly are a mixture of compounds, some of which are polymeric in nature. Illustrative of glycidyl ethers are the di- or polyglycidyl ethers of ethylene glycol, trimethylene glycol, glycerol, diglycerol, erythritol, mannitol, sorbitol, polyallyl alcohol, butanediol, hydrogenated bisphenol A, and the like.

The glycidyl ethers of polyhydric phenols include the glycidyl ethers of resorcinol, hydroquinone, catechol, pyrogallol, and the like as well as the glycidyl ethers of polynuclear phenols such as bisphenol A, bis(4-hydroxyphenyl)methane, and the like, and glycidyl ethers of the novolac resins such as bisphenol F and the like. The epoxy resins also include epoxidized olefins generally based on naturally occurring oils, such as epoxidized soybean oil, epoxidized cotton seed oil, epoxidized castor oil, epoxidized linseed oil, epoxidized menhaden oil, epoxidized lard oil and the like, but also including epoxidized butadiene, epoxidized polybutadiene, and the like.

Additional useful epoxy resins are diglycidyl isophthalate; triglycidyl p-aminophenyl; diglycidyl phenyl ether; triglycidyl ether of trihydroxybiphenyl; diglycidyl ether of bisphenol PA; triglycidoxy-1,1,3-triphenylpropane; and the like. Further examples of epoxy resins are vinylcyclohexenedioxide; limonene dioxide; 2,2-bis(3,4-epoxycyclohexyl)propane; diglycidyl ether; bis(2,3-epoxycyclopentyl)ether; dicyclopentadiene dioxide; 3,4-epoxycyclohexylmethyl-(3,4-epoxy)cyclohexane carboxylate; and the like. Further information on these epoxy resins and additional examples of useful epoxy resins are discussed and/or referred to in HANDBOOK OF EPOXY RESINS by H. Lee and K. Neville, McGraw-Hill Book Co., 1967.

The anhydride to epoxide equivalent ratio, that is the A/E ratio, is conventionally used to express the relative proportions of the anhydride groups and the epoxy groups present in a resin mixture, particularly when mixtures of molecules of different sizes in the anhydride and epoxide components are involved. We have found that the A/E ratio can suitably be from about 0.1:1 to about 2.5:1, preferably from about 0.3:1 to about 1.5:1 and most preferably from about 0.5:1 to about 1.3:1.

The presence of active hydrogen atoms such as found in water and in hydroxyl and carboxyl induce the anhydrideepoxy reaction and are particularly active in the presence of the anhydride accelerators. This is described in the above book by Lee and Neville. For this reason, it is essential particularly for significant shelf life of the intermediate composition that the presence of active hydrogen be minimized or substantially eliminated as a component or impurity in the initial resin mixture, particularly in the form of water, carboxyl or hydroxyl, or in the anhydride accelerator. This is accomplished by assuring that the initial anhydride reactants are substantially carboxyl-free and that all reactants are protected against contamination from atmospheric moisture. Predrying of one or more of the reactants may be desirable. Some polyepoxides such as the diglycidyl ether of bisphenol A contain reactive hydroxyl in each repeating unit. Hydroxyl is substantially eliminated in this instance by selecting a diglycidyl ether of bisphenol A which has a relatively low epoxy equivalent weight. As used herein, the expression "substantially free of active hydrogens" is used to mean that the reaction mixture contains insufficient active hydrogens to cause, in the presence of the anhydride accelerator, substantial anhydride-epoxy reaction in the first stage reaction.

The resin composition is conveniently formed into sheets using a fiber glass reinforcement. The fiber glass can be in the form of a woven glass fabric or randomly distributed glass fibers. When chopped glass fibers are used, they can suitably range from about 3 mm. to about 50 mm. in length and preferably from about 5 mm. to about 25 mm. in length. Other fibrous material can be used as the reinforcement or core material in the form of randomly distributed particles, fibers, fluff, paper, woven fabric, and the like. This can be made from natural materials such as cellulose, including sisal, hemp, cotton and linen, asbestos, etc., or a synthetic such as nylon, polyester, polyolefin, and the like.

The resin compositions can contain other constituents in addition to the resin components such as fillers, pigments or dyes for coloring the finished product, plasticizers, and the like. The fillers provide the desirable function of reducing the cost of the final product without significantly reducing the physical properties and can improve certain properties such as fire resistance, arc resistance and the like. Suitable filler material includes powdered calcium carbonate, clay, sands, powdered metals such as aluminum and iron, metal oxides such as iron oxide, alumina, etc., powdered silica, wood flour, walnut shell flour and the like. The filler is preferably inert in the composition, that is, it should not react with any of the reactants or catalyze a reaction involving the reactants. Also a material such as fused silica can be added to the resin formulation to increase its viscosity prior to the thickening reaction. Other additives which can be used are a suitable mold release agent or a material such as poly(methylmethacrylate), finely ground polyethylene, finely ground polystyrene and the like to impart a low profile, that is, a smooth surface, to the molded product.

The initial resin mixture with fiber reinforcement present can be thickened or B-staged by vinyl reaction without substantial anhydride-epoxy reaction to form sheet molding compound or prepared in particle form for use in injection molding or transfer molding. A resin mixture with powdered filler can be thickened to molding compound. The filled resin mixture can also be used as an adhesive, in wire coating, filament winding, and the like, with the adhesive coating or other coating thickened to a handleable form. The clear resin mixture can be used in filament winding, in forming laminates and the like and also thickened to a handleable form.

Since the double bond polymerization is highly exothermic, care must be exercised in order that the material does not heat high enough in the first stage polymerization which forms the styrene-grafted polyanhydride to cause a significant anhydride-epoxy, cross-linking reaction to a gel such that the intermediate resin will not properly melt or flow or cannot be easily molded. However, it may be desirable that the intermediate product contain some anhydride-epoxy bonding below the gelation stage to increase the melt viscosity of the resin when excessive fluidity during molding becomes a problem. When the fiber glass-resin mixture is laid down in relatively thin sheets, the exothermic heat of reaction is more readily dissipated than when thick sheets are used. Furthermore, the rate of the first stage reaction and therefore the heat buildup can be partially controlled by control of the free radical initiation itself. Since chemical free radical initiators generate free radicals at different rates, polymerization can be controlled by an appropriate selection of the chemical initiator, the amount used, and the time and temperature of the polymerization reaction.

In the first stage polymerization reaction the styrene completely reacts to form an intermediate product which is essentially free of volatile components. This intermediate composition is dry and handleable, that is, it can be handled, cut and the like without sticking to the hands, shears, and the like, and is readily moldable. When styrene is used without filler or reinforcing fiber, a clear intermediate product is obtained which is indicative of a homogeneous material and the absence of polystyrene. Since polystyrene and styrene-maleic anhydride copolymers are mutually insoluble, their concurrent presence in the intermediate product would be indicated by opacity. This homogeneous intermediate product will cure to a homogeneous resin product. In contrast a non-homogeneous intermediate product would result in a non-homogeneous resin product with inferior properties. The complete insolubility of the fully cured resin product in methyl ethyl ketone also indicates the absence of polystyrene in the final product.

In preparing the reaction solution the maleic anhydride can be added to the styrene monomer and stirred at a mildly elevated temperature, if necessary, until solution is obtained, next the preformed polyanhydride can be added with stirring until solution is obtained, then finally the epoxide can be added. Alternatively, all four components can be added together with stirring until solution is obtained or the epoxide can be added to the styrene and then the maleic anhydride and the preformed polyanhydride can be added. The anhydride accelerator and free radical initiator are generally added last, but prior to the first-stage reaction. Other procedures are also possible. In some instances one or more of the components may not be completely soluble in the solution. In this instance such component can be finely granulated, with the resin components then formed into a homogeneous, liquid dispersion or mixture, rather than a true solution. As a result of the fineness of the particles and the thoroughness of the dispersion, this mixture will function in the process similar to a true solution of the reacting components. The pigments, catalysts, filler, reinforcing fibers, and other optional components are then introduced and then the mixture can be thickened by copolymerization to form the intermediate composition, such as molding compound.

As described, a suitable anhydride-accelerator must be used in order to obtain a satisfactory second stage cure, particularly when mold curing is utilized. In order to prepare the intermediate compound without substantial anhydride-epoxy reaction, the anhydride accelerator must be substantially inactive at the conditions required for the free-radical reaction including the time and temperature of the reaction. Furthermore, adequate control of active hydrogen must be effected to insure that substantial anhydride-epoxy reaction does not occur. Therefore, an anhydride accelerator is preferably used which is substantially free of active hydrogen. If the temperature of the free radical reaction is increased, a less active anhydride accelerator is used. The relative inactivity of the anhydride accelerator in contrast with the activity of the free radical initiation is further emphasized when significant storage stability of the intermediate composition is desired. The anhydride accelerator functions by opening up the anhydride group for reaction with the epoxy group. This accelerator can suitably be a nitrogen containing anhydride accelerator, preferably a non-volatile liquid. The accelerator is incorporated into the initial reaction mixture in the amount of about 0.01 to about 10 weight percent, preferably about 0.1 to about 5 percent based on the resin components. Since the presence of an anhydride accelerator for the second stage anhydride-epoxide reaction can have a significant effect on any anhydride-epoxide reaction that may take place in the first-stage copolymerization procedure or during storage of the intermediate composition, its selection, particularly with respect to its activity and the amount used, must be carefully correlated with the other components and the conditions in the first-stage copolymerization to avoid a substantial amount of such anhydride-epoxy reaction in the first stage, as described above.

The preferred accelerators are tertiary nitrogen compounds particularly those in which one or more tertiary nitrogen atoms are in a ring structure including pyridine and its mono- and di-lower alkyl-substituted derivatives, N-lower alkyl-substituted imidazole, N-lower alkyl-substituted morpholine, N-lower alkyl-substituted piperidine, N,N-di-lower alkyl-substituted piperazine, and the like. Also included are the compounds containing tertiary nitrogen atoms in which the ring is attached to the nitrogen atom with one bond including N,N-di-lower alkylcyclohexylamine, benzyl di-lower alkylamine, benzyl tri-lower alkylammonium chloride and the like. We have further discovered that nitrogen containing anhydride accelerators can be used successfully in which there is labile hydrogen attached to the nitrogen, especially when used in minor amounts or with particular care, to avoid substantial anhydride-epoxy reaction in the copolymerization reaction, although the intermediate product containing these accelerators tends to be less storage stable. As used herein, lower alkyl includes methyl, ethyl, propyl, and butyl. The group of suitable anhydride accelerators includes morpholine; N-ethylmorpholine; N-aminopropylmorpholine; N,N-dimethylcyclohexylamine; benzyldimethylamine, 3-picoline; melamine; diallylmelamine and the like; imidazoles such as imidazole; 1-methylimidazole; 2-methylimidazole; 2-ethylimidazole; 1,2-dimethylimidazole; and the like; benzyltrimethylammonium chloride; dicyandiamide, piperazine; piperidine; and the like. A solid accelerator, such as dicyandiamide, can be finely powdered and thoroughly incorporated throughout the resin mixture.

The intermediate compound can be cured at an elevated temperature of about 65° C. to about 220° C., preferably about 140° C. to about 190° C. for a sufficient time to effect cure, namely, about 30 seconds to about 24 hours. The molding pressure, when utilized, generally will be between about 3 and about 200 kg./cm$^2$ and preferably about 25 to about 100 kg./cm$^2$. The cure conditions are related in part to the resin composition including the particular accelerator that is used. For suitable molding the total combined content of the reinforcing fiber and filler should be no greater than about 80 percent of the total composition. When fiber glass reinforcement is used, it will comprise from about 10 percent to about 80 percent, preferably about 20 percent to about 65 percent of the total composition. The filler will ordinarily be used in the range of about 5 percent to about 80 percent, preferably about 10 percent to about 40 percent of the total composition.

DESCRIPTION OF THE PREFERRED EMBODIMENTS

In the following examples the linear styrene-maleic anhydride polyanhydrides were Arco Chemical Company SMA 1000 and 2000 resins having a styrene to maleic anhydride mol ratio of about 1:1 and about 2:1 and a molecular weight of about 1,600 and 1,700, respectively. The diglycidyl ether of bisphenol A was Shell Chemical Company's Epon 826 having an epoxy equivalent weight of 180–188. The presence of styrene grafting in the thickened products was determined by the reaction stoichiometry, by their increased solubility in epoxy resins and by the application of liquid chromatography and infrared spectroscopy.

EXAMPLE 1

A 50 g. portion of a linear styrene-maleic anhydride copolymer having a styrene to maleic anhydride ratio of 1:1 was dissolved in 200 ml. of dioxane and one gram of benzoyl peroxide was added. After the reaction mixture was heated to 85° C. for 15 minutes, 90 g. of styrene were added dropwise over a two-hour period. The reaction mixture was then held at a temperature of about 85° C. for about 22 hours. The resin product was precipitated into hexane, was filtered, and then dried at 55° C. in vacuo. The resulting styrene-grafted styrene-maleic anhydride copolymer was a white powder weighing 125 g. which was a yield of 89 percent based on the initial reactants. The product was determined to have a solubility in Epon 826 of 22.4 grams per 100 grams of the epoxy resin and an A/E ratio of 0.081. This contrasts with a solubility in Epon 826 of the styrene-maleic anhydride copolymer prior to the instant grafting reaction of 3.9 grams per 100 grams of the epoxy resin at 80° C. Also this contrasts with a solubility of 2.2 grams of Koppers Company polystyrene PY-9868 per 100 grams of a diglycidyl ether of bisphenol A at 80° C.

EXAMPLE 2

A 50 g. portion of the styrene-maleic anhydride copolymer having a styrene to maleic anhydride ratio of 1:1 was dissolved in 200 ml. of dioxane and one gram of benzoyl peroxide was added. After the reaction mixture was heated to 85° C. for 15 minutes, the dropwise addition of the 90 g. of styrene was immediately initiated without the 15 minute delay of Example 1. After the styrene addition, the reaction mixture was held at a temperature of about 85° C. for about 22 hours. Hexane was used in the precipitation of the resin product which was filtered and dried at 55° C. in vacuo. In this experiment 113 g. of the styrene-grafted copolymer, a white powder, was recovered, which represented a yield of 81 percent. This product was found to have a solubility of 17.0 grams per 100 grams of the diglycidyl ether of bisphenol A at 80° C.

EXAMPLE 3

A 45 g. portion of a linear 1-hexene and maleic anhydride copolymer having a 1-hexene to maleic anhydride ratio of about 1:1 was dissolved in 200 ml. of dioxane and one gram of benzoyl peroxide was added. After the reaction mixture was heated to 85° C. for 15 minutes, 90 g. of styrene were added dropwise over a two-hour period. The reaction mixture was then held at a temperature of about 85° C. for about 22 hours. The resin product was precipitated in hexane, was filtered, and then dried at 55° C. in vacuo. The resulting styrene-grafted 1-hexene-maleic anhydride copolymer was a white powder weighing 111 g. which was a yield of 82 percent. The grafting of styrene onto the linear 1-hexene-maleic anhydride copolymer increased the solubility in the diglycidyl ether of bisphenol A from 2.6 to 6.9 grams per 100 grams of the epoxy resin.

EXAMPLE 4

The experiment of Example 3 was repeated except that 86.5 g. of a linear 1:1 copolymer of 1-octadecene and maleic anhydride were used and the resin product was precipitated into isopropyl alcohol. The dried product was a white powder weighing 118 g. representing a 67 percent yield. This styrene-grafted copolymer had a solubility in Epon 826 at 80° C. of 2.6 grams per 100 grams of resin in contrast with a solubility of 0.9 grams of the copolymer before the grafting.

EXAMPLE 5

A resin solution was prepared by mixing 12 percent maleic anhydride, 25 percent styrene, 37.5 percent of the diglycidyl ether of bisphenol A and 25.5 percent of the 2:1 styrene-maleic anhydride copolymer for about one hour until solution was obtained. To this solution were added 0.25 parts per hundred (phr.) 1-methylimidizole and 1.25 phr 2,2'azobis(2,4-dimethylvaleronitrile). A resin-fiber glass composite was prepared on a sheet molding compound machine with 57 percent of a one-half inch fiber glass content. The composite was thickened at a temperature of about 65° C. Analysis of the B-staged sheet disclosed that it contained no styrene and no polystyrene. Samples of this intermediate composition containing the styrene-grafted polyanhydride, the epoxy resin and the fiber glass reinforcement were cured at an elevated temperature in a heated compression mold and the fully cured product was determined to have excellent tensile strength and flexural strength.

EXAMPLE 6

Maleic anhydride (24 g.), styrene (50 g.), the 2:1 mol ratio styrene-maleic anhydride copolymer (51 g.) and benzoyl peroxide (1 g.) were refluxed for 24 hours in 200 ml. of dioxane. The reaction mixture was precipitated into hexane and the resin product was dried in vacuo at 80° C. The gas chromatograph chromatogram of this product was very similar to the chromatogram of the intermediate product of Example 5.

EXAMPLE 7

A resin solution was prepared by first mixing 12.5 kg. of styrene and 6 kg. of maleic anhydride briquettes. After the maleic anhydride had been broken into small particles, 18.75 kg. of the diglycidyl ether of bisphenol A were added. This was followed by the addition of 12.75 kg. of the 2:1 styrene-maleic anhydride copolymer. Mixing was continued for about one hour after which all solids were in solution. To 20 kg. of this solution were added 40 g. of 1-methylimidazole, 300 g. of fumed silica, and 300 g. of 2,2'azobis(2,4-dimethylvaleronitrile) catalyst. The composite was prepared on the sheet molding compound machine with 62 percent of a one-half inch (1.27 cm.) fiber glass content. The composite was stored in sheet form in single layers at 65° C. for 40 minutes. This thickened product comprised molecules of styrene-grafted styrene-maleic anhydride copolymer, the epoxy resin, the anhydride accelerator and the inert components. Samples of this intermediate product were compression molded at about 300°-325° F. for about five minutes. Typical properties for the molded product are a flexural strength of 54,000 psi. (ASTM D-790), a tensile strength of 24,000 psi. (ASTM D-638), and Izod impact strength of 36 foot-lbs./in. (ASTM D-256), and a Barcol (934-1) hardness of 67 (ASTM D-2585). The material also possessed a flexural strength at 150° C. of 30,000 psi. and a heat deflection temperature greater than 300° C. (ASTM D-648). This demonstrates the excellent properties resulting from the thermosetting reaction between the styrene-grafted polyanhydride and the epoxy resin.

EXAMPLE 8

A clear solution was prepared by thoroughly blending 50 g. of styrene, 75 g. of the diglycidyl ether of bisphenol A, 51 g. of the 2:1 styrene-maleic anhydride copolymer and two g. of 2,2'-azobis(2,4-dimethylvaleronitrile). The solution was placed in a polyethylene bowl and heated overnight at 115° F. (46° C.). The resulting material was non-fluid but gummy and showed a weight loss of 1.7 g. It was heated for an additional hour at 145° F. (62.8° C.). The resulting product was non-gummy and flexible. Analysis disclosed substantially complete consumption of styrene monomer and indicated that the major portion had reacted with the styrene-maleic anhydride copolymer by graft polymerization.

EXAMPLE 9

A resin mixture was prepared by mixing 175 g. of styrene and 84 g. of maleic anhydride in a blender for two minutes. Mixing was continued for 10 minutes after 262 g. of the diglycidyl ether of bisphenol A were added to the mixture. A 250 g. portion of this resin mixture was placed in a blender and 0.63 g. of 1-methylimidazole and 3.25 g. of 2,2'-azobis(2,4-dimethylvaleronitrile) were mixed in. 240 g. of this mixture were added to a polyethylene bag containing 190 g. of ¼ inch (6.3 mm.) glass fibers. After wet-out of the fibers by manual kneading, the resin-glass mixture was formed into a flat composite of about ⅛ inch (3.2 mm.) thickness between two cellophane sheets. This composite was placed for 10 minutes between two metal plates, 3 feet by 1.5 feet by ⅛ inch (91.5 cm. by 45.7 cm. by 3.2 mm) in dimension in an oven heated to 200° F. (93.3° C.). It was then removed and cooled to 40° F. (4.4° C.). The material was solid and fairly rigid and comprised styrene-grafted styrene-maleic anhydride copolymer, epoxy resin, anhydride accelerator and glass fibers. After 24 hours, a 120 g. portion of this composite was compression molded in the pan-shaped mold at 340° F. (171.1° C.). The resin-glass composite softened readily and flowed in the mold to a cure in five minutes. The flexural strength of specimens cut from the pan-shaped product averaged 11,600 psi.

The styrene-grafted polyanhydrides can be dissolved in an epoxy compound by selecting a monoepoxide or an epoxy resin in which the polyanhydride is suitably soluble or by using a volatile solvent to obtain solution, if necessary, together with other components as desired and cured or cross-linked to a hard rigid resin of excellent properties. Additionally, the styrene-grafted polyanhydride can be prepared in situ in the epoxy compound as described and cured to resins having excellent properties for a wide variety of uses. The reinforced molded products possess exceptional mechanical properties including exceptionally high tensile and flexural strengths and excellent retention of these properties at elevated temperatures. The electrical characteristics are excellent including the retention of the electrical properties upon exposure to moisture and heat. The reinforced thickened compositions can be readily compression molded into complex detailed shapes with exceptionally uniform glass fiber distribution throughout at comparatively short cure times.

It is to be understood that the above disclosure is by way of specific example and that numerous modifications and variations are available to those of ordinary skill in the art without departing from the true spirit and scope of the invention.

We claim:

1. A method of grafting styrene onto a polyanhydride copolymer having a linear backbone chain which comprises (1) preparing a solution consisting of a linear copolymer of styrene and maleic anhydride having a mol ratio of styrene to maleic anhydride of between about 1:1 and about 5:1 or a copolymer of a 1-alkene and maleic anhydride having a mol ratio of about 1:1 and a peroxide free radical initiator in a solvent selected from an oxygenated aliphatic hydrocarbon in which the oxygen atom is only bonded to carbon, said copolymer having between about three and about 500 repeating units, (2) heating said solution to a temperature between about 50° C. and about 150° C. sufficient to activate said free radical initiator, and (3) incrementally adding styrene to said solution at said temperature until from about 0.5 to about 10 mols of styrene have been added per anhydride equivalent in said polyanhydride copolymer whereby styrene side chains are randomly grafted to the linear backbone chain of said polyanhydride copolymer.

2. A method in accordance with claim 1 in which the said solution is heated at the said temperature between about one and 60 minutes before the styrene is added.

3. A method in accordance with claim 1 in which the polyanhydride copolymer is a linear copolymer of styrene and maleic anhydride in a mol ratio between about 1:1 and about 3:1.

4. A method of grafting styrene onto a polyanhydride copolymer having a linear backbone chain which comprises (1) forming a solution consisting essentially of (a) styrene monomer, (b) an anhydride component consisting of maleic anhydride monomer and a polyanhydride copolymer having a linear backbone chain and (c) a free radical initiator, the mol ratio of styrene monomer to maleic anhydride monomer being between about 1.5:1 and about 8:1 and the ratio of anhydride equivalents in the maleic anhydride monomer to the total anhydride equivalents in the anhydride component being between about 0.2:1 to about 1:1, said polyanhydride comprising the copolymer having between two and about 500 repeating units and prepared from one to 10 mols of styrene per mol of maleic anhydride or prepared from equimolar amounts of maleic anhydride and one or more two to 20 carbon 1-alkenes or halogen-substituted 1-alkenes, and (2) copolymerizing said styrene monomer and said anhydride component by free radical means at a temperature up to about 150° C. whereby a polyanhydride polymer is prepared having relatively short styrene side chains randomly grafted to the linear backbone chain of said polyanhydride copolymer.

5. A method of grafting styrene onto a linear chain polyanhydride polymer in accordance with claim 4 in which the polyanhydride polymer is a copolymer of styrene and maleic anhydride having a ratio of styrene to maleic anhydride between about 1:1 and about 4:1.

6. A method in accordance with claim 4 in which the mol ratio of styrene monomer to maleic anhydride monomer is from about 2:1 to about 6:1.

7. A method in accordance with claim 4 in which the said ratio of anhydride equivalents is between about 0.4:1 to about 0.9:1.

8. A styrene-maleic anhydride copolymer having a linear backbone chain consisting essentially of from about three to about 200 succinic anhydride groups per molecule, each succinic anhydride group alternating in the backbone chain with one styrene group or with a block of two or more linear styrene groups, the ratio of styrene groups to succinic anhydride groups in the backbone chain being from about 1:1 to about 10:1, and at least one linear styrene chain pendant from the said backbone group, the ratio of styrene groups in said pendant styrene chains to the succinic anhydride groups in the backbone chain being from about 0.5:1 to about 10:1.

9. A styrene-maleic anhydride copolymer in accordance with claim 8 in which the ratio of styrene groups to succinic anhydride groups in the backbone chain is between about 1:1 and about 5:1 and the ratio of styrene groups in the pendant styrene chains to the succinic anhydride groups in the backbone chain is between about 1:1 and about 5:1.

10. A styrene-grafted styrene-maleic anhydride copolymer in accordance with claim 8 in which the said copolymer is homogeneously associated with an epoxide having a 1,2-epoxy equivalent value greater than one, a saturated monoepoxy compound, or a mixture thereof in a handleable, thermosettable composition.

11. A handleable, thermosetable composition in accordance with claim 10 comprising an anhydride accelerator.

12. A method of grafting styrene onto a polyanhydride copolymer having a linear backbone chain which comprises (1) forming a solution consisting essentially of (a) styrene monomer, (b) an anhydride component consisting of maleic anhydride monomer and a polyanhydride copolymer having a linear backbone chain, the mol ratio of styrene monomer to maleic anhydride monomer being between about 1.5:1 and about 8:1 and the ratio of anhydride equivalents in the maleic anhydride monomer to the total anhydride equivalents in the anhydride component being between about 0.2:1 to about 1:1, said polyanhydride comprising the copolymer having between two and about 500 repeating units and prepared from one to 10 mols of styrene per mol of maleic anhydride or prepared from equimolar amounts of maleic anhydride and one or more two to 20 carbon 1-alkenes or halogen-substituted 1-alkenes, (c) a free radical initiator, (d) an epoxide having a 1,2-epoxy equivalent value greater than one, a saturated monoepoxy compound having from three to 20 carbon atoms, or a mixture thereof and (e) an anhydride accelerator, and (2) copolymerizing said styrene monomer and said anhydride component by free radical means at a temperature up to about 150° C. whereby a polyanhydride polymer is prepared having relatively short styrene side chains randomly grafted to the linear backbone chain of said polyanhydride copolymer without substantial reaction of the anhydride groups with the epoxide groups present in the mixture.

* * * * *